United States Patent [19]
Riviére

[11] Patent Number: 6,109,838
[45] Date of Patent: Aug. 29, 2000

[54] FACE MILLING CUTTER AND METHOD OF ASSEMBLING

[75] Inventor: Bertrand Riviére, Bourges, France

[73] Assignee: Seco Tools AB, Fagersta, Sweden

[21] Appl. No.: 09/095,138

[22] Filed: Jun. 10, 1998

[30] Foreign Application Priority Data

Jun. 10, 1997 [SE] Sweden .................................. 9702202

[51] Int. Cl.[7] ................................ B26D 1/12; B23P 15/34
[52] U.S. Cl. ................................ 407/36; 407/38; 407/44; 407/47; 407/113
[58] Field of Search .................................. 407/35, 36, 38, 407/39, 40, 44, 47, 48, 50, 53, 56, 113

[56] References Cited

U.S. PATENT DOCUMENTS

| | | | |
|---|---|---|---|
| 3,701,187 | 10/1972 | Erkfritz ...................................... | 407/48 |
| 3,708,843 | 1/1973 | Erkfritz ...................................... | 407/113 |
| 3,818,562 | 6/1974 | Lacey ...................................... | 407/113 |
| 3,955,259 | 5/1976 | Gustafsson ................................ | 407/40 |
| 4,090,801 | 5/1978 | Faber ...................................... | 407/113 |
| 4,194,860 | 3/1980 | Hopkins .................................... | 407/36 |
| 4,309,132 | 1/1982 | Adamson et al. ......................... | 407/38 |
| 4,425,063 | 1/1984 | Striegl ...................................... | 407/113 |
| 4,470,731 | 9/1984 | Erkfritz . | |
| 4,616,962 | 10/1986 | Ushijima et al. ......................... | 407/114 |
| 4,681,488 | 7/1987 | Markusson ............................... | 407/113 |
| 4,789,273 | 12/1988 | Wiacek et al. ............................ | 407/34 |
| 4,954,021 | 9/1990 | Tsujimura et al. ......................... | 407/53 |
| 5,082,400 | 1/1992 | Shiratori et al. ........................... | 407/40 |
| 5,190,418 | 3/1993 | Nakayama et al. ....................... | 407/113 |
| 5,871,309 | 2/1999 | Svensson .................................. | 407/40 |
| 5,984,592 | 11/1999 | Harper et al. ............................. | 407/40 |

FOREIGN PATENT DOCUMENTS

WO97/03779  2/1997  WIPO .

*Primary Examiner*—William Briggs
*Assistant Examiner*—Erica D Ergenbright
*Attorney, Agent, or Firm*—Burns, Doane, Swecker & Mathis, L.L.P.

[57] ABSTRACT

A face milling cutter comprises a holder adapted to be rotatable about an axis. A plurality of first cutting inserts, and a plurality of second cutting inserts are mounted in respective pockets of the holder. The first and second inserts alternate circumferentially with one another. The first and second inserts are identical and include a center hole for receiving a fastener screw. The central hole of the first inserts are oriented orthogonally relative to the center hole of the second inserts, whereby the first inserts are turned by about 90 degrees relative to the second inserts. The axial relationship of the second inserts relative to the first inserts is determined by shims disposed between the holder and respective ones of the second inserts.

9 Claims, 4 Drawing Sheets

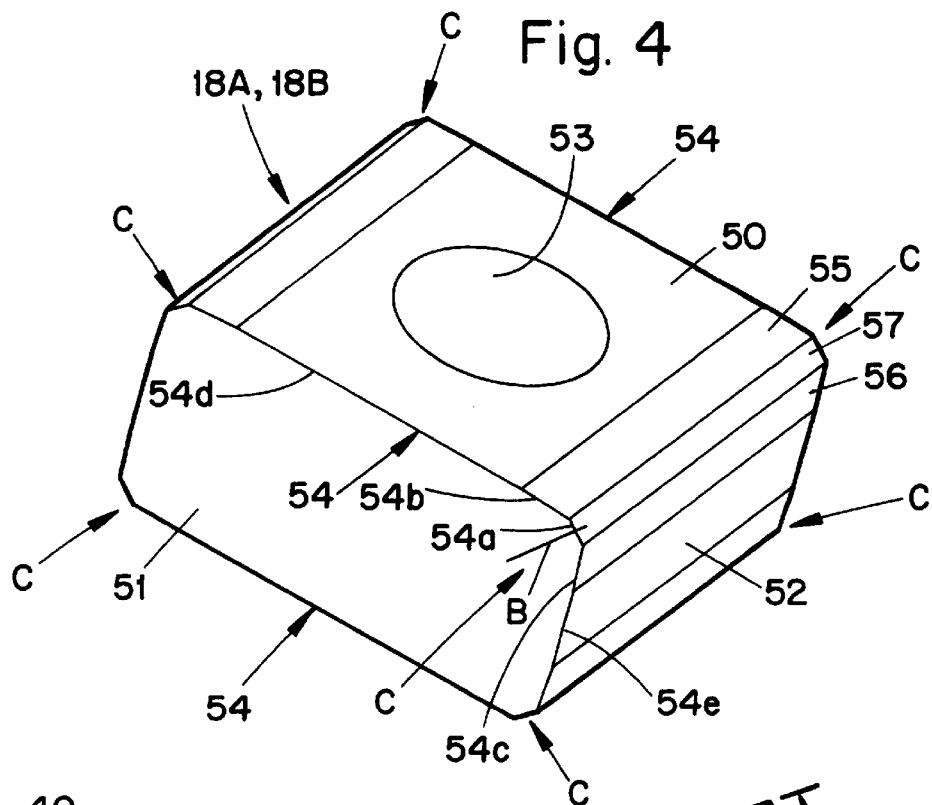
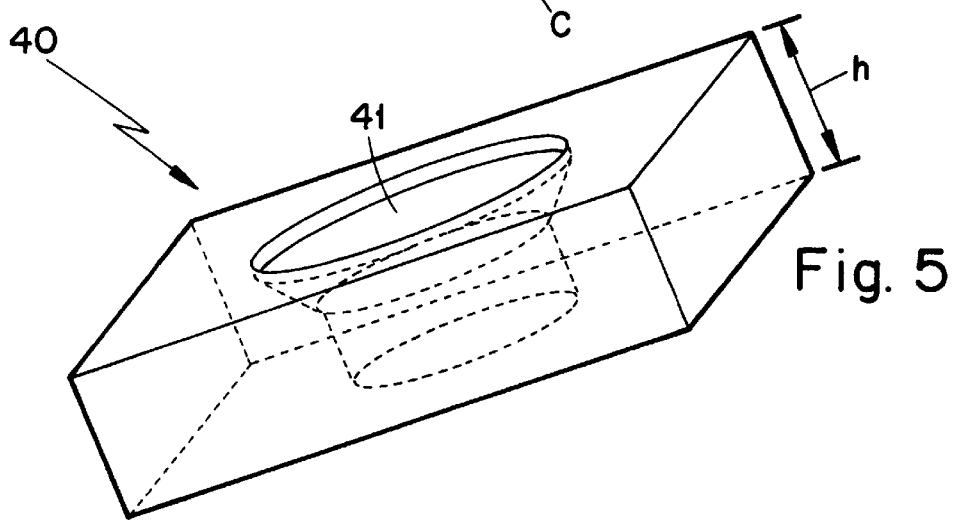
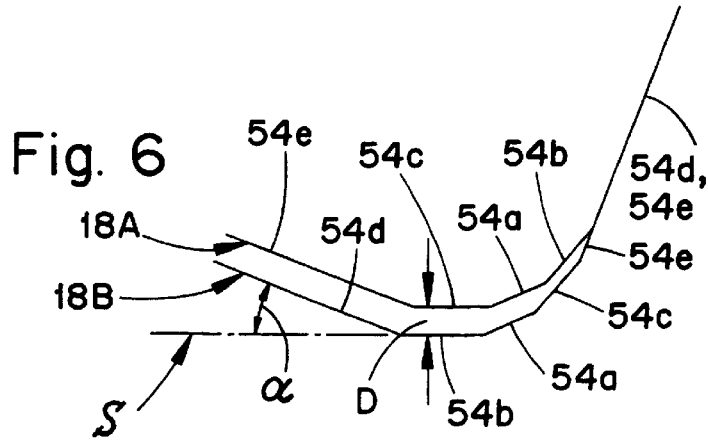

FACE MILLING CUTTER AND METHOD OF ASSEMBLING

BACKGROUND OF THE INVENTION

The present invention relates to a face milling cutter and a method for determining the axial position of cutting inserts provided in the face milling cutter, as well as a milling insert per se.

PRIOR ART

Through U.S. Pat. No. 4,470,731 there is previously known a face milling cutter including wiper inserts provided at the end surface of the milling body. A drawback with the known milling cutter is that the position of the wiper insert must be adjusted by hand with the aid of three screws, whereof two screws are provided to lock the position of a shim by friction in the adjusted position. There is a risk that the measured, correct position may be displaced in connection with the adjustment or during machining.

OBJECTS OF THE INVENTION

One object of the present invention is to provide a face milling cutter having easily adjustable wiper inserts.

Another object of the present invention is to provide a quick and precise method for determining the axial position of cutting inserts provided in a face milling cutter.

Still another object of the present invention is to provide a milling insert, which saves four cutting corners for further use in adjacent cutting insert pockets.

SUMMARY OF THE INVENTION

The present invention relates to a face milling cutter comprising a holder adapted to be secured to a rotatable spindle. The holder includes a cylindrical outer envelope surface and an axial end surface. A plurality of cutting inserts is provided, each insert including a central hole and a cutting edge. The inserts are secured to the holder in circumferentially spaced relationship at a radial distance from a center axis of rotation of the holder such that the cutting edge of each insert is disposed radially outwardly of the envelope surface. The cutting inserts include first cutting inserts and second cutting inserts. Each of the first and second cutting inserts has a major cutting edge portion extending generally parallel to the axis, and a minor cutting edge portion extending generally radially relative to the axis. Shims are disposed between the holder and respective ones of the second inserts. Each shim has a smaller width than the respective second insert and a thickness sized for positioning the respective second insert at a predetermined axial position lower than the first inserts, whereby the minor cutting edge portions of the second cutting inserts generate a surface on a workpiece. Fasteners extend through the central holes for securing the first and second inserts to the holder. The fasteners securing the first cutting inserts are oriented generally orthogonally relative to the fasteners securing the second inserts, whereby the first inserts are turned by about 90 degrees relative to the second inserts.

Preferably, the first and second inserts are of identical configuration.

The present invention also relates to a method of assembling the above-described face milling cutter, comprising the steps of:

A) providing a supply of shims of different thicknesses, the thicknesses varying by increments of about 5 μm;

B) mounting one of the first inserts;

C) mounting one of the shims;

D) mounting one of the second inserts on the shim and comparing an axial location of the mounted second insert with that of the mounted first insert;

E) removing the second insert and replacing the shim with another shim of different thickness if the first and second mounted inserts are not in a predetermined axial relationship in step D; and F) repeating steps B-E until all of the first and second inserts have been mounted.

The invention also pertains to a face milling insert comprising a body having parallel side faces. Both side faces are interconnected by at least one first edge surface and at least one second edge surface. The first and second edge surfaces intersect one another. An intersection of the second edge surface with each of the side faces forms a cutting corner. Each cutting corner includes a first bevel intersected by an imaginary bisector line of the corner, and second and third bevels formed on the side face and second edge face, respectively. Each of the second and third bevels extends to the first bevel. Each of the second and third bevels intersects the first edge surface to form respective cutting edges therewith.

BRIEF DESCRIPTION OF THE DRAWINGS

These and other objects have been obtained by a face milling cutter, a method and a milling insert with reference to the drawings, wherein:

FIG. 4 shows a perspective view of a cutting insert according to the present invention for the tool;

FIG. 5 shows a perspective view of a shim for the tool according to the present invention; and FIG. 6 is an enlarged fragmentary view of first and second cutting inserts for depicting the special relationship therebetween.

DETAILED DESCRIPTION OF A PREFERRED EMBODIMENT OF THE INVENTION

Figure 1A:
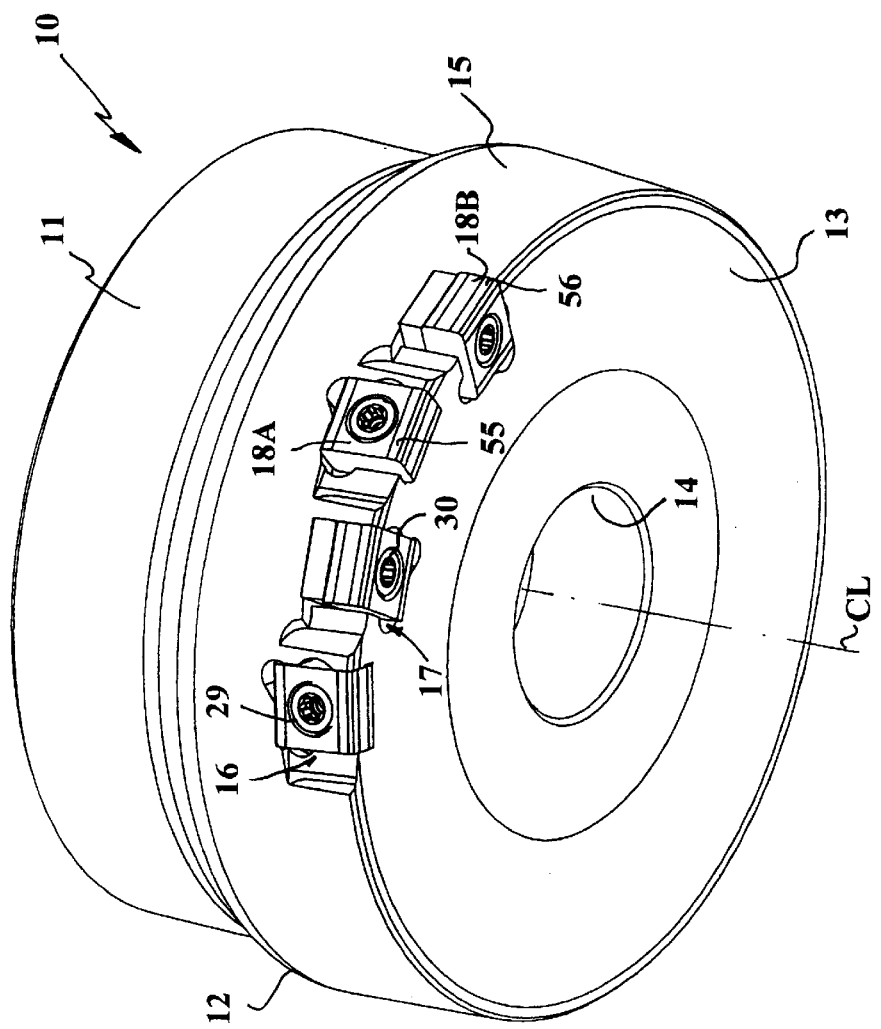
FIG. 1A shows a face milling cutter according to the present invention, in a bottom perspective view.

FIGS. 1A, 1B, 2 and 3 show the face milling cutter 10 according to the present invention which comprises a holder or body 11 which shall be mounted to a spindle, not shown. The holder has an edge portion 12 with an essentially cylindrical jacket surface 15, a ring-shaped axial end surface 13, and a central hole 14. A number of first and second pockets 16 and 17 are provided in the area of intersection between the envelope surface 15 and the ring-shaped surface 13, which are provided to hold cutting inserts 18A and 18B, respectively. It is understood that more pockets and cutting inserts than are shown are arranged on the tool.

Each first pocket 16 (FIG. 2) consists of a recess in the body 11 and forms a radial support surface 19, an axial support surface 20 and a tangential support surface 21. The radial support surface 19 is provided to transfer radial cutting forces from the cutting insert 18A during the milling operation. The axial support surface 20 is provided to transfer axial cutting forces from the cutting insert 18A. The tangential support surface 21 is provided to transfer tangential cutting forces from the cutting insert 18A.

Each second pocket 17 (FIG. 3) consists of a recess in the body 11 and forms a radial support surface 22, an axial support surface 23 and a tangential support surface 24. The function of the support surfaces 22–24 is the same as explained above in connection with the support surfaces 19–21.

The first and second pockets 16 and 17 are provided to receive the cutting inserts 18A and 18B, which are inclined about 90° relative to each other. This means that the cutting inserts 18A are tangentially mounted with central threaded holes thereof directed substantially towards the axis of rotation CL of the milling cutter, and that the cutting inserts 18B are end-mounted with central threaded holes thereof directed substantially parallel with the axis of rotation of the milling cutter. The inserts 18A and 18B are arranged in circumferentially alternating relationship. The pockets may be evenly or unevenly distributed around the periphery of the body. Immediately in front of each pocket 16 and 17 is provided a chip space 27 and 28.

The cutting insert according to FIG. 4 for example can be made of a cutting tool material available on the market today, wherein tungsten carbide is a preferred material. The insert is preferably manufactured by grinding.

The first and second cutting inserts 18A, 18B are identical; each is square and comprises substantially planar parallel side faces 50, substantially planar parallel first edge surfaces 51, substantially planar parallel second edge surfaces 52 and a central opening 53 extending through the side surfaces 50. Four cutting edges 54 (three of which being referenced in FIG. 4) are defined by lines of intersection between the surfaces 50, 51, 52, each of the cutting edges 54 lying in the plane of a respective first edge surface 51.

A portion 54a of each cutting edge 54 is defined at the transition between a side surface 50 and a planar (or curved) first chamfer 57 formed on a second edge surface 52. The chamfer 57 is surrounded by two substantially planar second chamfers 55, 56 formed on the surfaces 50, 52, respectively, and arranged symmetrically about a bisector B of the cutting corner. Those second chamfers 55, 56 intersect each edge surface 51 to form cutting edge portions 54b and 54c, respectively. The portion 54d of each cutting edge which extends along the side face 50 between two corners C, is straight. Also, the portion 54e of each cutting edge which extends along the edge surface 51 between two corners C, is straight and oriented perpendicular to the portion 54d.

The chamfers 55 and 56 form an angle α of 5 to 10 degrees (see FIG. 6) with the surfaces 50 and 52, respectively.

During milling, the cutting edge portion 54b of each first cutting insert 18A is active, whereas the cutting edge portion 54c of the second cutting insert 18B is active. This division of work between adjacent cutting inserts requires that the cutting inserts be able to be exactly adjusted relative to each other, which can be done with the aid of a shim 40. The size of the cutting inserts is generally based on the feed per revolution for full utilization of the available cutting edge. The cutting inserts 18A and 18B are identical, which makes confusion of these impossible when mounting the cutting inserts in the milling tool.

Each of the four cutting edges 54 includes two cutting corners C, there being a total of eight cutting corners C per insert. When the cutting inserts have worn out and must be exchanged, the worn first cutting inserts 18A can be transferred to the pockets 17 while the worn second cutting inserts 18B can be transferred to the pockets 16 for presenting fresh edges. This can be done since only four of the eight cutting corners of each cutting insert wear out in each pocket. With reference to FIG. 6, during a face milling operation, a main cutting edge of each of the first inserts 18A will be defined by the portion 54b if the cutting depth is small, or by the portion 54d if the cutting depth is normal or large. In either case, the portion 54c will constitute a minor cutting edge for the first insert 18A. The portions 54d and 54b of the first insert 18A are generally parallel to the axis of rotation during the face milling operation, and the portion 54c extends generally radially.

During the same face milling operation, a main cutting edge of each of the second inserts 18B will be defined by the portion 54c if the cutting depth is small, or by the portion 54e if the cutting depth is normal or large. In either case, the portion 54b will constitute a minor cutting edge for the second insert 18B. The portions 54c and 54e of the second insert 18B are generally parallel to the axis of rotation during the face milling operation, and the portions 54b extend generally radially, for generating the final surface S on the workpiece.

The inserts are arranged so that the active cutting edge of the first cutting insert 18A is situated radially from the axis of rotation just as far as the radially extreme part of the active cutting edge of the second cutting insert 18B. The cutting inserts may alternatively have other basic shapes and sizes, such as rectangular or triangular.

Each of the inserts 18A is secured by a tightening screw 29 threaded into a hole 25 formed in the body 11, and each of the inserts 18B is secured by a tightening screw 30. According to the preferred embodiment each tightening screw 30 is fastened in a hollow fastening screw 31 which has been previously tightened into the pocket 17 (see FIG. 1B). The fastening screw 31 has a collar 31a which is intended to abut against a corresponding shoulder of the hole 41 in the shim 40.

The threaded holes 25, 26 for attaching respective inserts 18A, 18B are placed such that when mounting the cutting insert by tightening a screw 29 or 30, the cutting insert is forced in direction towards all support surfaces (19–21 or 22–24) in the respective pocket. Each cutting insert 18A is positioned with a clearance angle in relation to the workpiece surface. This angle is usually less than 15° and is preferably in the magnitude of 7°.

A shim 40 according to FIG. 5, is provided to be fitted into in each pocket 17 for supporting an end-mounted cutting insert 18B. The shim is substantially polygonal and preferably square. The shim has a centrally positioned hole provided to receive the fastening screw 31. The area of the biggest surface of the shim 40 is somewhat less than that of the corresponding side surface 50 of the cutting insert 18B. The thickness h of the shim is in the magnitude of at least 50% of the thickness of the cutting insert 18B. Shims 40 of different thicknesses, (e.g., varying progressively by 5 μm intervals from a thickness of 4 mm) shall be accessible during assembling of the mill. The total number of shims 40 to choose among is in the magnitude of 8–15, preferably about 11. Stated another way the interval is about 4 mm±X ·5 μm, where X is from 0 to 7.

Figure 1B:
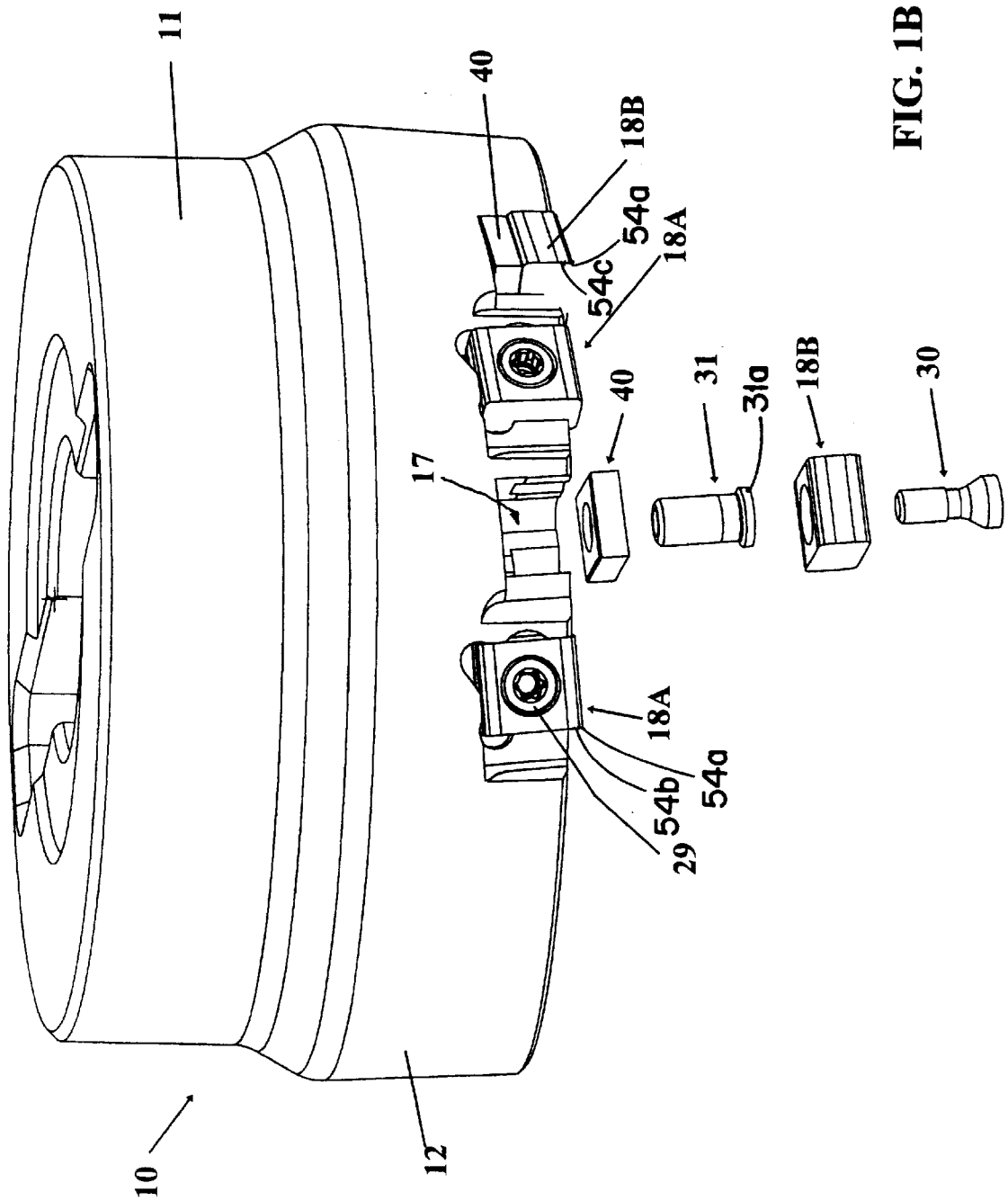
FIG. 1B shows a face milling cutter according to the present invention, in an exploded top perspective view.
Figure 2:
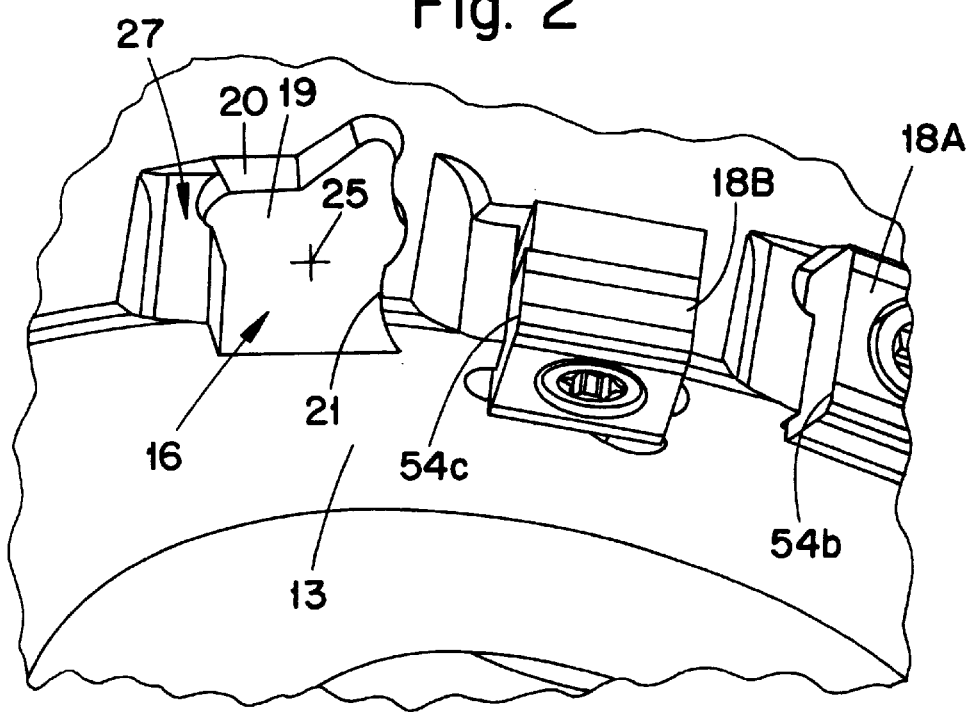
FIGS. 2 and 3 show parts of the tool shown in FIG. 1A, in a fragmentary bottom perspective view.
Figure 3:
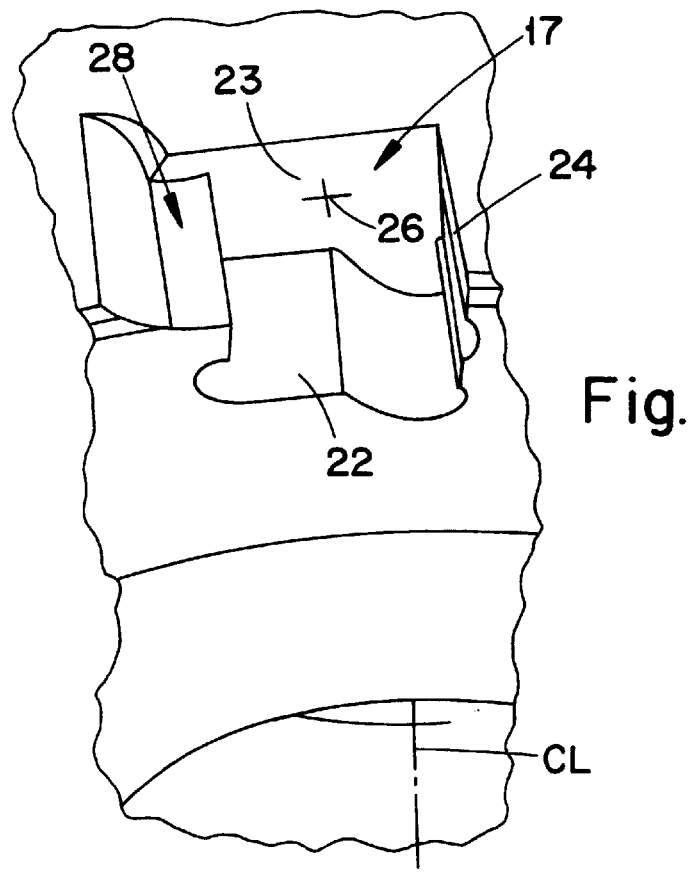

The mill 10 is assembled as follows, reference being had primarily to FIG. 1B. The first cutting insert 18A is mounted first, by pushing one of its planar sides by hand into the pocket 16 against the radial support surface 19 and against the support surfaces 20 and 21, whereafter the screw 29 is inserted through the hole of the cutting insert and is threaded into in the threaded hole 25. Thereby the cutting insert 18A will be forced both against the radial support surface 19 and against the support surfaces 20 and 21 since the center axis of the hole 25 is provided closer to the support surfaces 20, 21.

Then in connection with mounting the second cutting insert 18B the fastening screw 31 is first brought through the central hole 41 of the shim 40. The shim is brought to abutment against the axial support surface 23 in the pocket 17 simultaneously as the fastening screw is tightened. At tightening of the fastening screw the shim will not be displaced in any direction but is pressed hard against the support surface 23. The shim 40 may in that position project somewhat from the envelope surface 15 in the radial direction of the milling body. Subsequently one planar side of the cutting insert is pushed into in the pocket 17 against the shim 40 and against the support surfaces 22 and 24, whereafter the screw 30 is inserted into the hole of the cutting insert and is threaded into in the threaded boring of the fastening screw 31. Thereby the cutting insert is forced partly against the shim 40 and partly against the support surfaces 22 and 24 by having the center axis of the threaded boring of the screw 31 provided closer to the support surfaces 22, 24 than to the center of the threaded hole 26. The screws 30 will be oriented orthogonally relative to the screws 29 as is apparent from FIG. 1A. That is, the screws 29 will be oriented generally perpendicular to the axis of rotation, whereas the screws 30 will be oriented generally parallel to that axis. Thus, the first inserts 18A are turned by abut 90 degrees relative to the second inserts.

The position of the cutting insert 18B is then measured in relation to the cutting insert 18A. For instance, with reference to FIG. 6, the distance D between the edge portion 54c of the first insert 18A, and the edge portion 54b of the second (lower) insert 18B is measured. If that distance is a desired value, e.g., about 0.04 mm, then the adjustment is considered ideal for the second cutting inserts 18B to generate the desired surface S on the workpiece. The positioned cutting insert 18B then constitutes a reference for the following adjustments of the cutting inserts 18B. If, due to manufacturing tolerances of the holder, the position of the cutting insert differs too much from the reference value, this can be corrected by choosing a different shim with a more suitable thickness. Once a face milling cutter is calibrated, it is sufficient just to swap work cutting inserts 18A, 18B and retain the fine position.

To summarize, the assembly method comprises the following steps:

(i) arrange a number of shims of smaller thickness and width than the associated cutting insert 18B, said thickness h of the shim 40 being chosen from a group of several shims which differ in thickness progressively by about 5 μm; (ii) tangentially mount a first cutting insert 18A; (iii) end mount a shim 40 with a known thickness; (iv) end-mount a second cutting insert 18B against the shim 40 and compare the position with that of the first cutting insert 18A; (v) screw the second cutting insert 18B firmly against the shim wherein the thickness (h) of the shim determines the major cutting edge position of the second cutting insert relative to the first cutting insert 18A; (vi) exchange shims if that axial value does not correspond to the desired position; and (vii) repeat the above-captioned steps until the tool is wholly provided with cutting inserts.

The invention is in no manner limited to the above-described embodiment, but can be varied freely within the limits of the subsequent claims.

What is claimed is:

1. A face milling cutter comprising:

a holder adapted to be secured to a spindle, the rotatable about a center axis holder including a cylindrical outer envelope surface and first and second axial end surfaces;

a plurality of cutting inserts disposed at the second axial end surface, each insert including a central hole, the inserts secured to the holder in circumferentially spaced relationship at a radial distance from said center axis of rotation of the holder, the cutting inserts including first cutting inserts and second cutting inserts, each of the first and second cutting inserts having a major cutting edge portion extending generally parallel to the axis, and a minor cutting edge portion extending generally radially relative to the axis, all of the first inserts disposed at the same axial position along the axis, all of the second inserts disposed at the same axial position along the axis;

a plurality of shims disposed axially between the holder and respective ones of the second inserts, whereby a surface of each shim contacts a surface of the respective second insert, each shim having a thickness dimension extending parallel to the axis and sized for positioning the respective second inserts such that the minor cutting edges of the second inserts are situated axially beyond the minor cutting edges of the first inserts in a direction away from the first axial end surface, whereby the minor cutting edge portions of the second inserts cut deeper than the minor cutting edge portions of the first inserts to generate a planar surface on a workpiece, the first axial end surface being free of cutting inserts; and fasteners extending through the central holes for securing the first and second inserts to the holder, the fasteners securing the first inserts being oriented generally orthogonally relative to the fasteners securing the second inserts, whereby the first inserts are turned by about 90 degrees relative to the second inserts.

2. The cutter according to claim 1 wherein the first and second inserts are arranged in circumferentially alternating relationship, the shims being of less thickness than the respective second cutting inserts.

3. The cutter according to claim 1 wherein the major cutting edge portions of the first inserts are spaced radially from the center axis by a distance substantially equal to an extent by which the major cutting edge portions of the second inserts extend.

4. The cutter according to claim 1 wherein the first and second inserts are of identical configuration.

5. The cutter according to claim 4 wherein each of the first and second inserts includes two planar parallel side faces, planar parallel first edge surfaces interconnecting the side faces, and planar parallel second edge surfaces interconnecting the side faces, each of the major and minor cutting edge portions lying in a plane defined by a respective first edge surface, a transition between each second edge surface and a respective side face defined by at least a first chamfer, an intersection of the first chamfer and one of the first edge surfaces defining one of the major and minor cutting edge portions.

6. The cutter according to claim 1 wherein the holder includes first and second pockets for receiving the first and second inserts, respectively, the first pockets including generally radially extending threaded holes for receiving threaded fasteners securing the first inserts in first pockets, the second pockets including threaded holes extending generally parallel to the axis for receiving threaded fasteners securing the second inserts in the second pockets, each pocket including support surfaces for supporting edge surfaces of the respective insert, the threaded holes arranged to cause the inserts to be forced against the support surfaces.

7. A face milling insert comprising a body having parallel side faces, both side faces interconnected by at least one first edge surface and at least one second edge surface, each of the side faces being larger than each of the first and second edge surfaces, the first and second edge surfaces intersecting one another, an intersection of the second edge surface with each of the side faces forming a cutting corner, each cutting corner including a first bevel intersected by an imaginary bisector line of the corner, and second and third bevels formed on the side face and second edge surface, respectively, each of the second and third bevels extending to the first bevel, each of the second, and third bevels intersecting the first edge surface to form respective cutting edges, therewith.

8. A face milling cutter comprising:

a holder adapted to be secured to a spindle, rotatable about a center axis the holder including a cylindrical outer envelope surface and first and second axial end surfaces;

a plurality of cutting inserts disposed at the second axial end surface, each insert including a central hole, the inserts secured to the holder in circumferentially spaced relationship at a radial distance from said center axis of rotation of the holder, the cutting inserts including first cutting inserts and second cutting inserts of identical configuration to the first inserts, each of the first and second cutting inserts having a major cutting edge portion extending generally parallel to the axis, and a minor cutting edge portion extending generally radially relative to the axis;

a plurality of shims disposed axially between the holder and respective ones of the second inserts, whereby a surface of each shim contacts a surface of the respective second insert, each shim having a thickness dimension extending parallel to the axis and sized for positioning the respective second inserts such that the minor cutting edges of the second inserts are situated axially beyond the minor cutting edges of the first inserts in a direction away from the first axial end surface, whereby the minor cutting edge portions of the second inserts cut deeper than the minor cutting edge portions of the first inserts to generate a planar surface on a workpiece; and fasteners extending through the central holes for securing the first and second inserts to the holder, the fasteners securing the first inserts being oriented generally orthogonally relative to the fasteners securing the second inserts, whereby the first inserts are turned by about 90 degrees relative to the second inserts.

9. A face milling cutter comprising:

a holder adapted to be secured to a spindle, rotatable about a center axis the holder including a cylindrical outer envelope surface and first and second axial end surfaces;

a plurality of cutting inserts disposed at the second axial end surface, each insert including a central hole, the inserts secured to the holder in circumferentially spaced relationship at a radial distance from said center axis of rotation of the holder, the cutting inserts including first cutting inserts and second cutting inserts, each of the first and second cutting inserts having a major cutting edge portion extending generally parallel to the axis, and a minor cutting edge portion extending generally radially relative to the axis;

a plurality of shims disposed axially between the holder and respective ones of the second inserts, whereby a surface of each shim contacts a surface of the respective second insert, each shim having a thickness dimension extending parallel to the axis and sized for positioning the respective second inserts such that the minor cutting edges of the second inserts are situated axially beyond the minor cutting edges of the first inserts in a direction away from the first axial end surface, whereby the minor cutting edge portions of the second inserts cut deeper than the minor cutting edge portions of the first inserts to generate a planar surface on a workpiece;

fasteners extending through the central holes for securing the first and second inserts to the holder, the fasteners securing the first inserts being oriented generally orthogonally relative to the fasteners securing the second inserts, whereby the first inserts are turned by about 90 degrees relative to the second inserts;

wherein the holder includes first and second pockets for receiving the first and second inserts, respectively, the first pockets including generally radially extending threaded holes for receiving threaded fasteners securing the first inserts in first pockets, the second pockets including threaded holes extending generally parallel to the axis for receiving threaded fasteners securing the second inserts in the second pockets, each pocket including support surfaces for supporting edge surfaces of the respective insert, the threaded holes arranged to cause the inserts to be forced against the support surfaces.

* * * * *